United States Patent
Mangelsen

(10) Patent No.: US 7,413,429 B1
(45) Date of Patent: *Aug. 19, 2008

(54) METAL CLAY EXTRUDER

(75) Inventor: William P. Mangelsen, Kowloon (HK)

(73) Assignee: Sino Harvest Limited, Kwun Tong, Kowloon (HK)

( * ) Notice: Subject to any disclaimer, the term of this patent is extended or adjusted under 35 U.S.C. 154(b) by 267 days.

This patent is subject to a terminal disclaimer.

(21) Appl. No.: 11/144,555

(22) Filed: Jun. 3, 2005

(51) Int. Cl.
B29C 47/00 (2006.01)

(52) U.S. Cl. .................. 425/376.1; 425/461; 222/390; 222/391

(58) Field of Classification Search .............. 425/190, 425/191, 376.1, 87, 458, 461; 222/391, 390; 426/516
See application file for complete search history.

(56) References Cited

U.S. PATENT DOCUMENTS

| | | | | | |
|---|---|---|---|---|---|
| 1,318,928 | A | * | 10/1919 | Shields | 222/327 |
| 2,420,616 | A | * | 5/1947 | Palmer | 425/72.1 |
| 2,955,530 | A | * | 10/1960 | Nilo | 100/289 |
| 3,262,404 | A | * | 7/1966 | Morz et al. | 425/183 |
| 3,984,033 | A | * | 10/1976 | Groth et al. | 222/333 |
| 4,127,375 | A | * | 11/1978 | Nelson | 425/313 |
| 4,456,450 | A | * | 6/1984 | Heling | 425/376.1 |
| 5,183,671 | A | * | 2/1993 | Perez | 425/190 |
| 6,439,274 | B1 | * | 8/2002 | DeBoisblanc | 141/67 |

* cited by examiner

Primary Examiner—Yogendra Gupta
Assistant Examiner—Maria Veronica D Ewald
(74) Attorney, Agent, or Firm—G. Brian Pingel; Camille L. Urban

(57) ABSTRACT

The present invention provides a clay extruder usable for shaping clay into desired patterns. The extruder has a screw disposed within a sleeve, a plunger located on the screw and inside the sleeve, a handle located on the screw and outside of the sleeve, and a perforated disk opposite the insertion of the screw into the sleeve. The handle is used to turn the screw and move the plunger through the sleeve. As the plunger pushes clay out the sleeve, an o-ring around the plunger prevents clay from leaking back, and a perforated disk molds the clay into a desired pattern. Metal construction allows the extruder to be subjected to high amounts of torque and pressure without damage or failure.

9 Claims, 5 Drawing Sheets

METAL CLAY EXTRUDER

BACKGROUND OF THE INVENTION

1. Field of the Invention

The present invention relates to clay shaping tools, and more particularly, to clay extruders.

2. Description of the Prior Art

To aid in the shaping of clay, artisans have long used clay extruders. Simple clay extruders consist of a plunger that is pushed through a hollow structure by application of pressure on a handle connected to the plunger. By use of holes with different designs at the ends of extruders, clay can be extruded into different shapes. Hand held extruders are basically syringes for clay. Plastic syringe type clay extruders require great force to extrude clay and are subject to failure from the stress required to push clay through an open end. Metal syringe type extruders are more rigid than plastic extruders and are able to accommodate more force than plastic extruder. However, metal extruders are also difficult to operate. Both metal and plastic extruders are prone to leaking back of clay past the plunger.

It is therefore desirable to have an extruder that prevents leaking back of clay. It is also desirable to have an extruder that needs less force to operate. It is further desirable to have an extruder that can accommodate a high amount of torque.

SUMMARY OF THE INVENTION

The present invention is an apparatus for extruding clay. A screw jack disposed within a sleeve is manually turned to push a plunger into the sleeve. As the plunger pushes into the sleeve, any clay in the sleeve is forced out an open end. The open end has a disc perforated with a desired design. Different designs in the perforated disc result in different shapes of clay that is extruded through the disc. The handle on the screw resembles a "T" allowing for easy application of force to turn the screw. An O-ring between the plunger and the sleeve prevents leaking back of clay.

By making the apparatus out of metal, the apparatus is able to withstand greater torque on the screw and higher pressure on the sleeve. Texturing the sleeve aids in gripping of the sleeve and further increases the amount of force that may be applied to the handle.

An advantage of the present invention over previous extruders is that less force needs to be applied to rotate a screw jack than to directly push a plunger.

Another advantage of the present invention is the prevention of leak back of clay.

An additional advantage of the present invention is metal construction which withstands high torque and pressure.

Yet another advantage of the present invention is texturing on the sleeve to provide a better grip of the extruder.

Other objects, features, and advantages of the present invention will be readily appreciated from the following description. The description makes, reference to the accompanying drawings, which are provided for illustration of the preferred embodiment. However, such embodiment does not represent the full scope of the invention. The subject matter which the inventor does regard as his invention is particularly pointed out and distinctly claimed in the claims at the conclusion of this specification.

DETAILED DESCRIPTION OF THE PREFERRED EMBODIMENT

Figure 1:
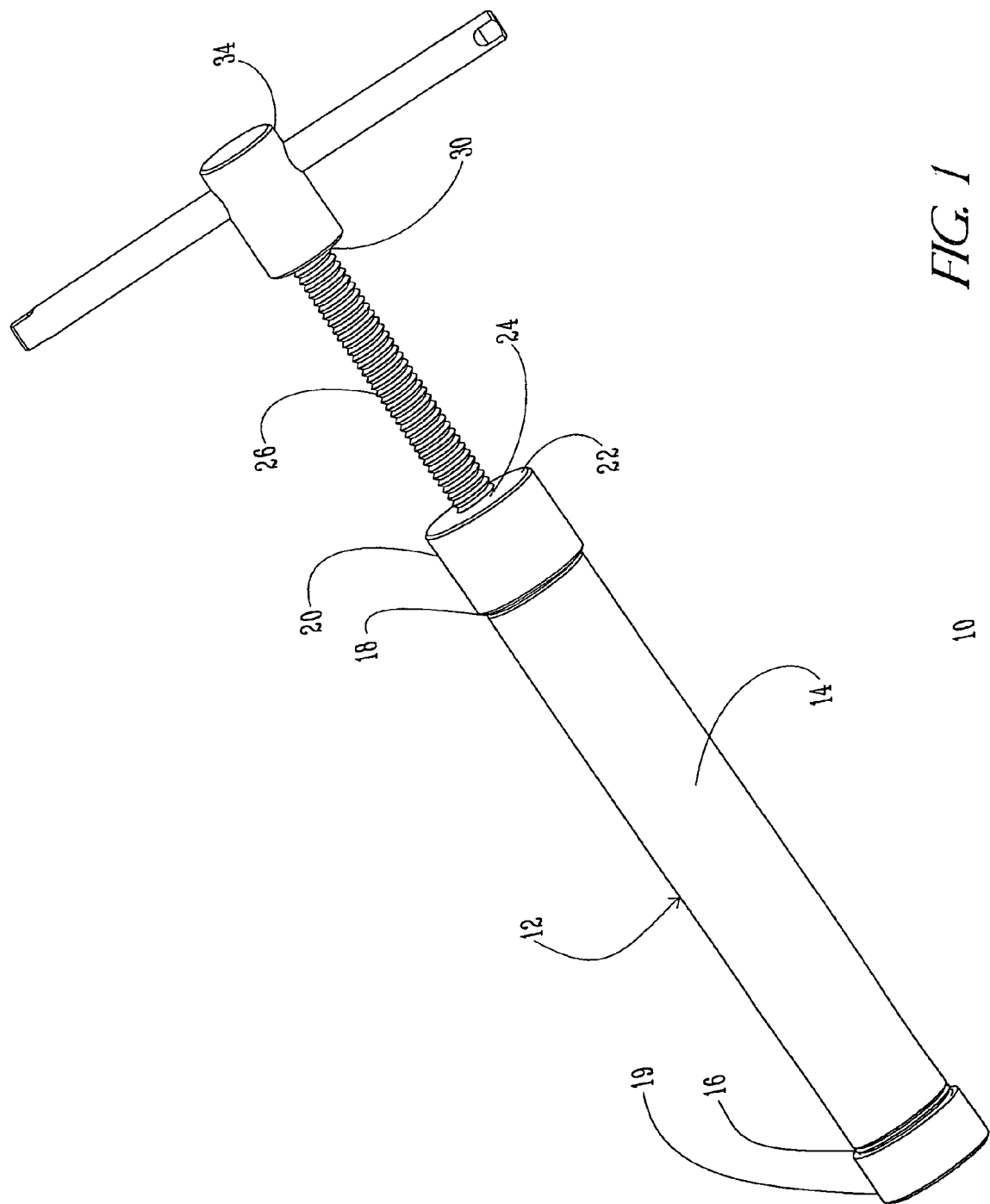
FIG. 1 is a perspective view of the preferred embodiment of the clay extruder of the present invention.

The present invention of a clay extruder 10 is shown in FIG. 1. The extruder 10 has a hollow sleeve 12 with a body portion 14, a first end 16, and a second end 18. An extrusion cap 19 serves as an extrusion means and is associated with the sleeve first end 16. A screw cap 20 is associated with the sleeve second end 18. A top 22 on the screw cap 20 has an aperture 24 to receive a screw 26. In the preferred embodiment the screw 26 is externally threaded and the screw cap 20 is internally threaded at the aperture 24 so that the screw 26 and the screw cap 20 engage each other. Rotation of the screw 26 pushes the screw 26 further into or out of the sleeve 12. Clay, not shown, in the sleeve 12 is pushed out of the sleeve 12 as the screw 26 is rotated and pushed into the sleeve 12.

Figure 2:
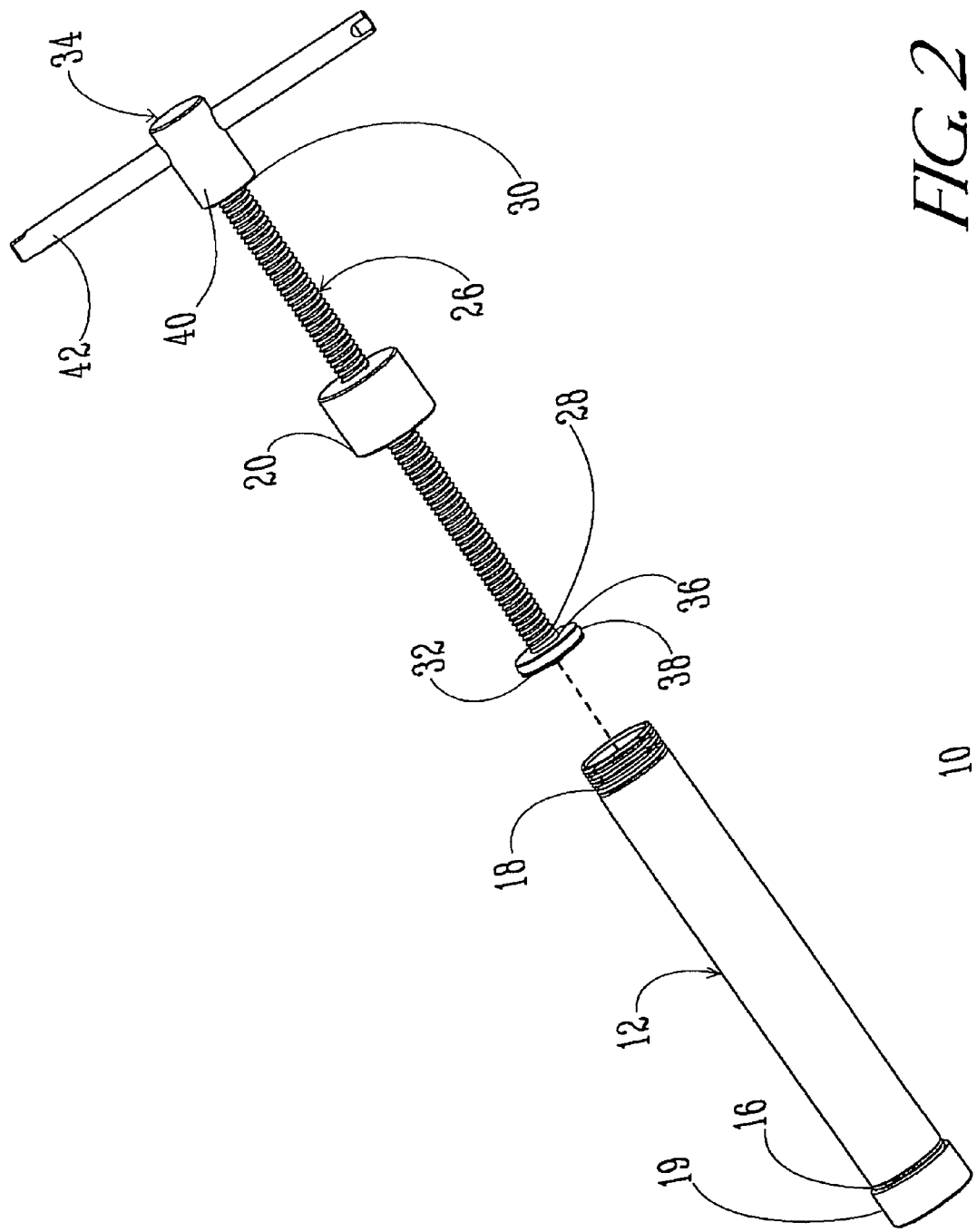
FIG. 2 is a perspective view of the extruder of FIG. 1 showing the screw removed from the sleeve.

As shown in FIG. 2, the screw 26 has a first end 28 and a second end 30. A plunger 32 is associated with the screw first end 28 and a handle 34 is associated with the screw second end 30. The handle 34 allows manual rotation of the screw 26. As the screw 26 moves into the sleeve 12, the plunger 32 engages any clay in the sleeve 12 and pushes the clay therefrom to pass though the extrusion cap 19.

Figure 5:
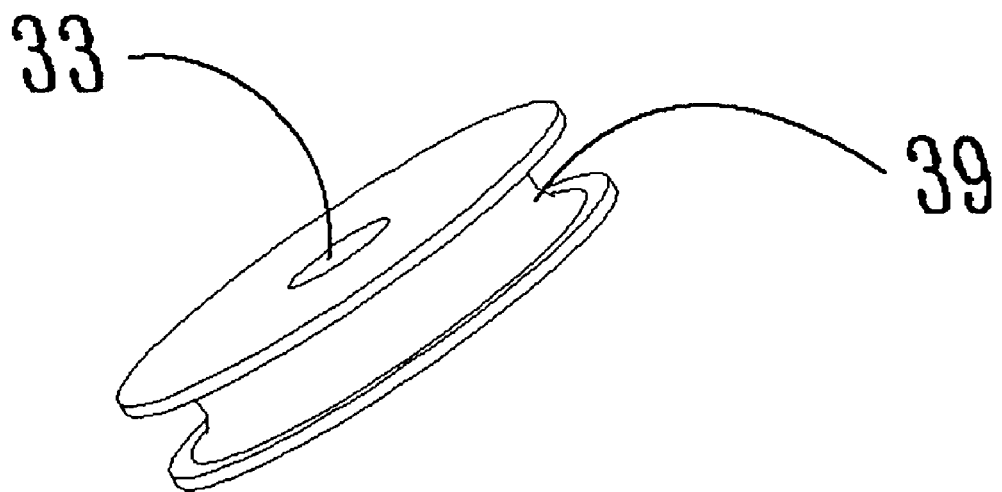
FIG. 5 is a perspective view in elevation of a plunger of the preferred embodiment.

The plunger 32 of the preferred embodiment is shown in greater detail in FIG. 5. The plunger 32 of the preferred embodiment defines an aperture 33. The plunger aperture 33 is at least as large as the screw first end 28 for placement of the screw first end 28 into aperture 33.

If the plunger 32 were to rotate with the screw 26, then clay engaged by the plunger 32 may become twisted inside the sleeve 12. In the preferred embodiment a swivel means 36 is associated with the screw 26 and the plunger 32 and allows the plunger 32 to swivel irrespective of rotation of the screw 26. To form the swivel means 36 in the preferred embodiment, the plunger 32 is fitted on the screw first end 28 by placement of the screw first end 28 into the plunger aperture 33 and the screw first end 28 is then riveted. Riveting the screw first end 28 retains the plunger 32 but allows free movement, i.e. swiveling, of the plunger 32 on the screw first end 28. The swivel means 36 thus prevents twisting of the clay.

Another feature of the preferred embodiment seen in FIG. 2 is an o-ring 38 serving as a sealing means. The o-ring 38 surrounds the plunger 32 and separates the plunger 32 from the sleeve 12. The o-ring 38 inhibits passage of clay between the plunger 32 and the sleeve 12 and in this manner the o-ring 38 prevents leak back of clay. In the preferred embodiment of the plunger shown in FIG. 5, the plunger 32 has a concave surface 39 for receiving the o-ring 38.

Figure 3:
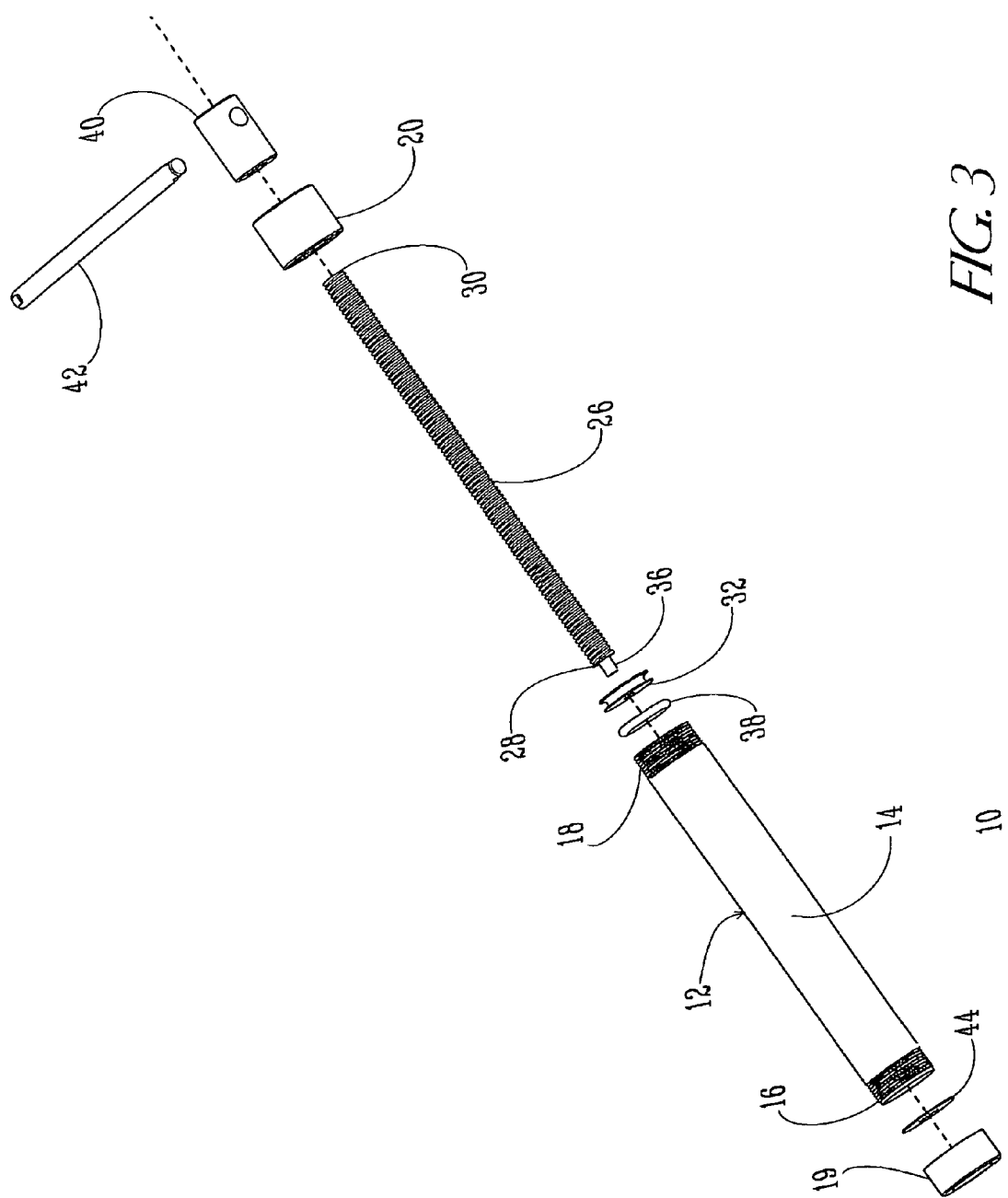
FIG. 3 is a perspective view of the extruder of FIG. 1 disassembled.

FIG. 3 shows the extruder 10 disassembled. The handle 34 of the preferred embodiment of the extruder 10 has a head member 40 and a lever 42. The lever 42 is disposed through the head member 40 in a "T" configuration. This configuration accommodates application of greater force on the lever 42 and subsequently higher torque on the screw 26.

Figure 4:
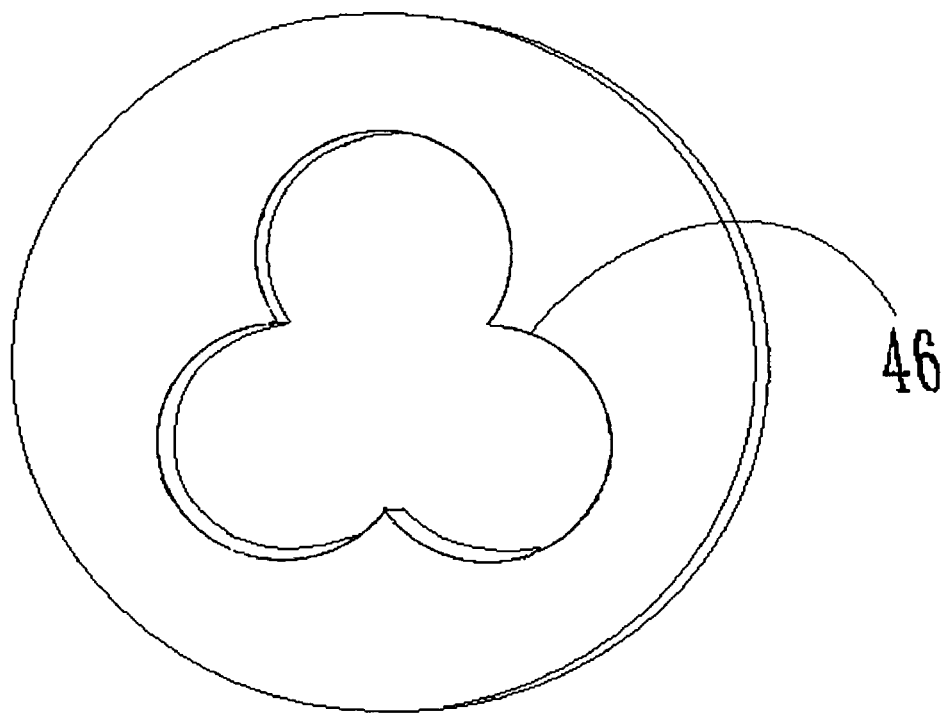
FIG. 4 is a perspective view in elevation of an extrusion disc of the preferred embodiment.

Similar to the screw cap 20, the extrusion cap 19 is also removable in the preferred embodiment. An extrusion disk 44 sits between the extrusion cap 19 and the sleeve first end 16. The extrusion disk 44 is perforated with a desired design. An example of a possible desired design 46 is seen in FIG. 4. The desired design 46 can be any shape or pattern capable of being expressed by perforating the extrusion disk 44. Clay pushed through the extrusion disk 44 is forcibly shaped into the desired design 46.

The preferred embodiment of the extruder 10 is made of metal. Metal construction is rigid and capable of withstanding high torque and pressure. The sleeve body 14 of the preferred embodiment is also textured to aid in grasping and prevention of slippage during manual turning of the screw 26.

Thus, the present invention has been described in an illustrative manner. It is to be understood that the terminology that has been used is intended to be in the nature of words of description rather than of limitation.

Many modifications and variations of the present invention are possible in light of the above teachings. For example, perforation of the extrusion disk 44 other than that seen in FIG. 4 is possible. As another example, the screw 26 may be of different lengths as long as the plunger 32 is capable of engaging the clay. As further examples, the handle 34 may be of different configurations capable of manual grasping and the screw cap 20 and/or the extrusion cap 19 may be permanently attached or even molded onto the sleeve 12. Therefore, within the scope of the appended claims, the present invention may be practiced otherwise than as specifically described.

What is claimed is:

1. An apparatus for extrusion of pliable clay material in alternatively selectable design shapes, said apparatus comprising:
   a substantially cylindrical hollow sleeve having a body portion with a first end and a second end;
   an elongated screw having a first end within said sleeve and a second end at least partially outside of said sleeve;
   a plunger associated with said first end of said screw within said sleeve and including a concave surface around its periphery and an O-ring set within said concave surface and sufficiently sized to be in simultaneous contact with said concave surface and the interior of said sleeve, said plunger includes swivel means such that rotation of said screw does not rotate said plunger against said pliable material;
   a screw cap associated with attached to and capping said second end of said sleeve and having a top with a central aperture through which said second end of said screw extends;
   a handle associated with the second end of said screw, said handle comprising a head member attached to the second end of said screw;
   extrusion shaping means associated with the terminus of the sleeve first end and being perforated to restrict but still allow the movement of said pliable material through said extrusion means in one of said selectable designs, said extrusion shaping means comprising:
      i. a retainer cap removably attached to the terminus of said sleeve first end and having a central opening;
      ii. a perforated extrusion disk located within the interior of said retainer cap between said retainer cap and said first end of said sleeve to partially close the opening therein, said disk restricting but still allowing the movement of said pliable material through said retainer cap;
      iii. said extrusion disk perforated in a desired design such that extrusion of said pliable material through said disc shapes said pliable material into a desired shape;
   said apparatus with the exception of said O-ring is composed of a substantially rigid material;
   said sleeve is externally textured to enhance gripping of said sleeve during manual rotation of said screw;
   said first and second end of said sleeve are externally threaded and said retainer cap and said screw cap are internally threaded to engage said first and second ends of said sleeve respectively; and
   wherein said swivel means comprising said plunger further includes an aperture, said screw first end passing through said plunger aperture and riveted such that said plunger cannot be removed from said screw first end but said plunger can freely rotate.

2. The apparatus of claim 1, wherein said handle further comprises:
   a lever attached to said head member and sufficiently elongated for assisting in manual manipulation to rotate said screw.

3. The apparatus of claim 1 wherein said substantially rigid material is a metal.

4. An apparatus for extrusion of pliable clay material in alternatively selectable design shapes, said apparatus comprising:
   a substantially cylindrical hollow sleeve having a body portion with a first end and a second end;
   an elongated screw having a first end within said sleeve and a second end at least partially outside of said sleeve;
   a plunger associated with said first end of said screw within said sleeve and including a concave surface around its periphery and an O-ring set within said concave surface and sufficiently sized to be in simultaneous contact with said concave surface and the interior of said sleeve, said plunger includes swivel means such that rotation of said screw does not rotate said plunger against said pliable material;
   a screw cap attached to and capping said second end of said sleeve and having a top with a central aperture through which said second end of said screw extends;
   a handle associated with the second end of said screw, said handle comprising a head member attached to the second end of said screw; and
   extrusion shaping means associated with the terminus of the sleeve first end and being perforated to restrict but still allow the movement of said pliable material through said extrusion means in one of said selectable designs, said extrusion shaping means including:
      i. a retainer cap attached to the terminus of said sleeve first end and having a central opening;
      ii. a perforated extrusion disk located within the interior of said retainer cap between said retainer cap and the terminus of said sleeve first end to partially close the opening therein, said disk restricting but still allowing the movement of said pliable material through said retainer cap;
      iii. said extrusion disc is perforated in a desired design such that extrusion of said pliable material through said disc shapes said pliable material into a desired shape;
   said sleeve, said screw, said plunger, said screw cap, said retainer cap, and said extrusion disk are composed of a substantially rigid material;
   wherein said swivel means comprises said plunger further including an aperture, said screw first end passing through said plunger aperture and riveted such that said plunger cannot be removed from said screw first end but said plunger can freely rotate.

5. An apparatus for extrusion of pliable clay material in alternatively selectable design shapes, said apparatus comprising:

a.) a substantially cylindrical hollow sleeve having a body portion with a first end and a second end;

b.) an elongated screw having a first end within said sleeve and a second end at least partially outside of said sleeve;

c.) a plunger associated with said first end of said screw within said sleeve, said plunger includes an aperture and said screw first end passes through said plunger aperture and is riveted such that said plunger cannot be removed from said screw first end but said plunger can freely rotate;

d.) an O-ring encircling the periphery of said plunger and sufficiently sized to be in simultaneous contact with said plunger and the interior of said sleeve;

e.) said plunger includes a concave surface around its periphery to accommodate said O-ring;

f.) a screw cap attached to and capping said second end of said sleeve and having a top with a central aperture through which said second end of said screw extends;

g.) a handle associated with the second end of said screw, said handle comprises:
  i. a head member attached to the second end of said screw;
  ii. a lever attached to said head member and sufficiently elongated for assisting in manual manipulation to rotate said screw;

h.) extrusion shaping means associated with the terminus of said sleeve first end and being perforated to restrict but still allow the movement of said pliable material through said extrusion means in one of said selectable designs, said extrusion shaping means includes:
  i. a retainer cap removably attached to the terminus of said sleeve first end and having a central opening;
  ii. a perforated extrusion disk located within the interior of said retainer cap between said retainer cap and the terminus of said sleeve first end to partially close the opening therein, said disk restricting but still allowing the movement of said pliable material through said retainer cap;
  iii. said extrusion disc is perforated in a desired design such that extrusion of said pliable material through said disc shapes said pliable material into a desired shape;

i.) said sleeve, said screw, said plunger, said screw cap, said retainer cap, and said extrusion disk are composed of metal;

j.) said sleeve is externally textured to enhance gripping of said sleeve during manual rotation of said screw; and k.) said first and second end of said sleeve are externally threaded and said retainer cap and said screw cap are internally threaded to engage said first and second ends of said sleeve respectively.

6. The apparatus of claim 4, wherein said handle further comprises a lever attached to said head member and sufficiently elongated for assisting in manual manipulation to rotate said screw.

7. The apparatus of claim 4 wherein said substantially rigid material is a metal.

8. The apparatus of claim 4 wherein said sleeve is externally textured to enhance gripping of said sleeve during manual rotation of said screw.

9. The apparatus of claim 4 wherein said first and second end of said sleeve are externally threaded and said retainer cap and said screw cap are internally threaded to engage said first and second ends of said sleeve respectively.

* * * * *